United States Patent [19]

Delaney et al.

[11] Patent Number: 4,841,295
[45] Date of Patent: Jun. 20, 1989

[54] LOCAL AREA NETWORK WITH BIASING ARRANGEMENT FOR FACILITATING ACCESS CONTENTION BETWEEN WORK STATIONS CONNECTED TO A COMMON BUS

[75] Inventors: Robert H. Delaney, Blairstown; Charles R. Kalmanek, Jr., Hoboken; Robert C. Restrick, III, Hopatcong, all of N.J.

[73] Assignee: American Telephone and Telegraph Company, AT&T Bell Laboratories, Murray Hill, N.J.

[21] Appl. No.: 890,260

[22] Filed: Jul. 24, 1986

[51] Int. Cl.$^4$ .............................................. H04Q 9/00
[52] U.S. Cl. .................................................. 340/825.5
[58] Field of Search ... 364/200 MS File, 900 MS File; 340/825.5

[56] References Cited

U.S. PATENT DOCUMENTS 3,796,992  3/1974  Nakamura et al. ............... 340/147
4,320,457  3/1982  Tanikawa ........................... 364/200
4,516,205  5/1985  Eing et al. .......................... 364/200

Primary Examiner—Gareth D. Shaw
Assistant Examiner—John G. Mills
Attorney, Agent, or Firm—Alfred G. Steinmetz

[57] ABSTRACT

A local area data distribution system includes a plurality of data processing stations connected to a common bus. Individual data processing stations contend with each other for access to the bus while the bus is held at a predetermined and controlled but overridable logic state by applying their priority code bit by bit to the bus and comparing the logic state of the bus with the bit they are applying thereto. A biasing arrangement holds the bus at the predetermined and controlled logic state during the contention interval at a signal level that may be easily overridden by an output of any one of the individual data processing stations.

16 Claims, 4 Drawing Sheets

LOCAL AREA NETWORK WITH BIASING ARRANGEMENT FOR FACILITATING ACCESS CONTENTION BETWEEN WORK STATIONS CONNECTED TO A COMMON BUS

FIELD OF THE INVENTION

This invention relates to a local data distribution system and in particular to a bus oriented architecture and to the proper biasing of a data distribution bus to optimize the application of priority codes on the bus by individual data processing stations during contention for access activity.

BACKGROUND OF THE INVENTION

In a bus oriented data distribution architecture a plurality of data processing stations are connected to a common data distribution bus. The distribution system is normally operated in two modes of operation: a data transmission mode and a contention mode. During the data transmission mode any particular station transmits data on that bus by bringing the bus into successively different signal or logic states. Similarly, a data driver at a terminal end of a bus may apply data to the bus to be transmitted to one of the data processing stations. In systems where only one data processing station may transmit data at one time, two or more stations may simultaneously compete for access to the bus. A contention mode of operation is utilized to give a particular station priority should two or more data processing stations attempt to transmit data on the bus at the same time.

In a contention mode of operation, two or more individual data processing stations simultaneously apply priority codes to the data distribution bus in order for one of them to gain access thereto: It is essential that the bus be maintained at some predetermined and controlled reference logic state during this mode of operation. This predetermined and controlled reference logic state must establish the reference state for the entire length of the bus and simultaneously permit individual data processing stations connected thereto to override the reference state of the bus in order to place its priority code onto the bus where it may be compared with the priority codes of other data processing stations also competing for access to the bus at the same time.

SUMMARY OF THE INVENTION

A local area data distribution system having data transmission and contention modes of operation includes an access control system which establishes a controlled logic state on a data distribution bus during a contention interval for allowing a plurality of data processing stations to simultaneously contend with one another in gaining access to the bus. It establishes a controlled state level on the bus that allows each of the contending data processing stations to apply a priority code to the bus to determine which station will gain access to the bus by comparison of the priority codes.

During a contention interval the bus is held at a predetermined and controlled bias or 'weak' logic state which may be overridden by a priority code bit output of any of the data processing stations. This weak logic state is accomplished through use of a bus biasing system, which holds the bus in an easily overridable logic state during contention activity to allow the priority code bit of any particular work station to control and establish a different logic state on the entire bus.

BRIEF DESCRIPTION OF THE DRAWINGS

An appreciation and understanding of the invention may be readily attained by reference to the following specification and the accompanying drawing herein.

DETAILED DESCRIPTION

Figure 1:
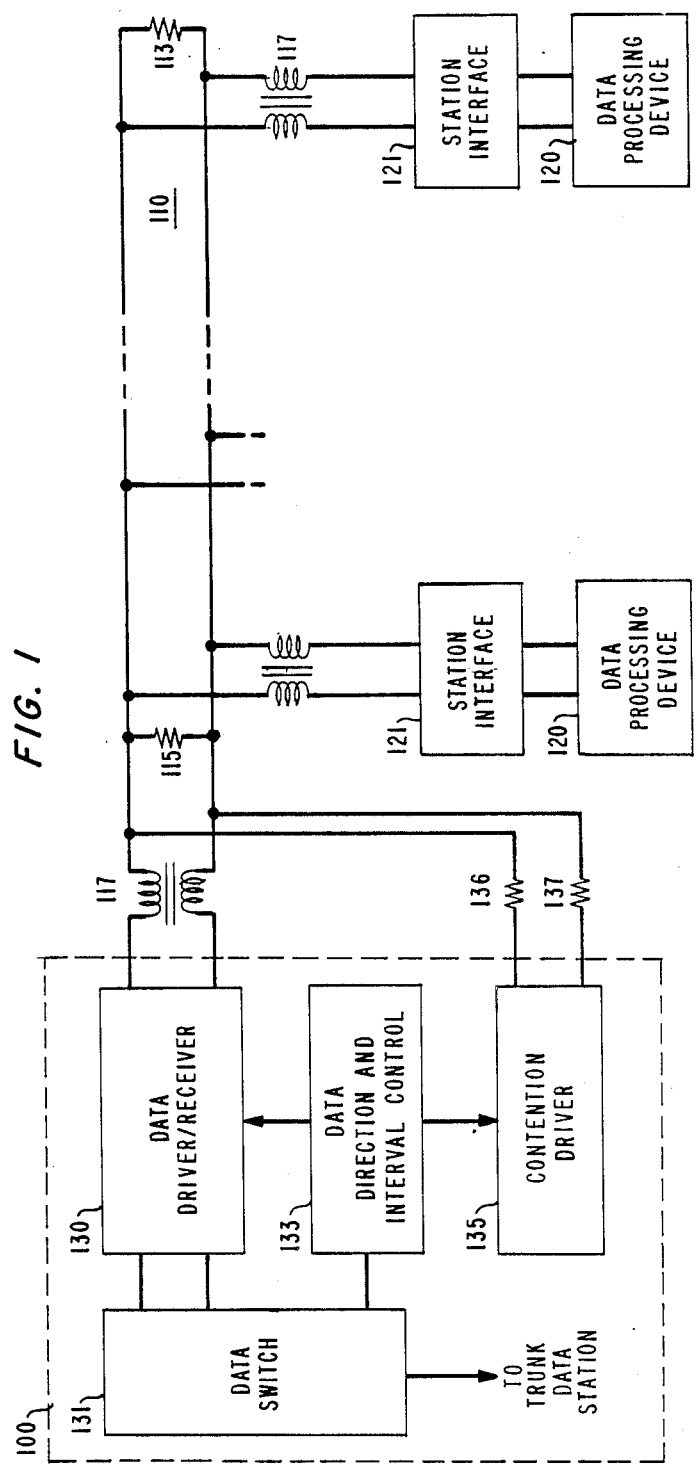
FIG. 1 is a block schematic of a data distribution system including its data distribution bus, its bus drivers, the interface circuits and associated data processing stations connected thereto.

A data distribution bus 110 of a local data distribution network and its associated data processing devices is shown in FIG. 1. The data distribution bus 110 is intended to transmit data bidirectionally from any one of a plurality of data processing stations connected to the bus 110 to a bus termination interface unit 100. A plurality of data processing devices 120 are each coupled, via individual station interface circuits 121 to bus 110. These data processing devices 120 (two are shown) may be distributed along the length of the bus, but need not be distributed in any structured dimensional configuration. The data distribution bus 110 may be a two wire pair or other suitable broad band cable transmission medium. The far end of the bus is terminated in a resistive termination impedance 113 equal to the resistive characteristic transmission impedance of the bus 110. The near end of the bus 110 is also terminated by a resistive termination impedance 115 which is selected to be greater than the characteristic impedance of the bus 110.

The near end of bus 110 is connected via common mode choke 117 to a data driver/receiver interface unit 130 which during the data transmission mode transmits data to and receives data from the data transmission bus 110, and it is in turn connected to a data switch 131. The data switch 131 interconnects the bus 110 via interface unit 130 to a host computer and/or to other data distribution bus networks. A data direction and interval control 133 is connected to the data driver/receiver unit 130 and is operative to determine if the data driver/receiver unit 130 is operative to transmit data from the switch 131 to the bus 110 or from the bus 110 to the switch 131. In one particular embodiment data is transmitted as data packets and switch 131 is embodied as a packet switch. The data driver/receiver unit 130 and the station interface circuits 121 are all connected to the bus 110 via common mode choke filter 117.

The direction of data transmission on the bus 110 is controlled by the data direction and interval control 133. The data direction and interval control 133 repeatedly applies a synchronization signal to the data driver/receiver 130 which in turn broadcasts it to the station interfaces 121. This synchronization signal is followed by a direction signal indicating the direction of data transmission. When the data switch 131 does not have data to send to the data processing stations 120 the direction signal is sent out onto the data distribution bus 110 having a code designation indicating to each station interface 121 that if it desires it may now contend for access to the bus in order that it may send data to the data driver/receiver unit 130.

When data flow is from a data processing device 120 to the data driver/receiver unit 130 the individual data processing station with data to transmit must first gain access to the bus 110 for transmitting the data. If two or more data processing devices 120 simultaneously have data to transmit, they must contend with each other to gain access to the bus. Each individual data processing device 120 utilizes a particular priority code assigned to the station interface 121 connecting it to the bus. The station interface compares its code with the code placed on the bus by station interfaces 121 of other contending data processing devices 120 when access to the bus 110 is desired. The contention interval is established under control of the data direction and interval control 133 which biases the bus 110 at a predetermined logic state that station interfaces may override.

During a contention interval each station interface transmits its priority code to the bus 110 bit by bit. It applies a positive voltage to the bus to indicate a logic one and tristates (i.e.—its output is disabled to a high impedance) to represent a logic zero value. Each station interface 121 compares successive ones and zeros appearing on the bus with the bit values of its own station priority code until it detects a logic one on the bus at the same time it transmits a logic zero. That particular station interface then drops out of contention. This process continues until the station interface with the highest priority code wins contention and gains access to the bus 110.

During the contention interval the data driver/receiver unit 130 is inactive (tristated) and the near end bus termination impedance is significantly altered from its value that exists during the data transmission mode of operation when the data driver/receiver 130 is transmitting to bus 110. A contention driver 135 is activated and in concert with a resistive network comprising resistors 115, 136 and 137 provides for a termination impedance equal to the characteristic impedance of the bus 110 during the contention interval. For the duration of the contention interval the data transmission bus 110 must be primarily biased to a logic zero state and yet be readily overridable for the entire length of the bus by application of a logic state of any of the station interface circuits 121 that wishes to change the bus bias level to a logic one state. This override function is facilitated by the contention driver 135 which is enabled by the data direction and interval control 133 to provide the proper bus impedance termination and biasing during a contention interval prior to data transmission by a data processing device 120.

The contention driver 135 is similar in circuitry to the data driver/receiver 130 but is coupled to the bus 110, via a pair of balanced resistors 136 and 137, and bypasses the common mode choke filter 117. The output of the contention driver 135 places the bus 110 in a weak zero logic state at a controlled level that may be easily overridden by any of the station interface circuits 121 to change a state of the bus 110 to a logic 'one' state so that the bus is driven by the station interface 121 to a logic 'one' state for its entire length.

The balanced resistors 136 and 137 coupling the output of the contention driver 135 to the bus 110 combine with the terminating impedance 115 at the near end to terminate bus 110 at its real or resistive characteristic impedance. The output of contention driver 135 produces a zero logic state on the data distribution bus 110 over its entire length but at a bias level such that any one station interface 121 can readily override it and apply a different logic state to the entire length of the bus. An understanding of this operation may be readily attained by referring to FIG. 2 which discloses a schematic of the overall bus level drive scheme.

Figure 2:
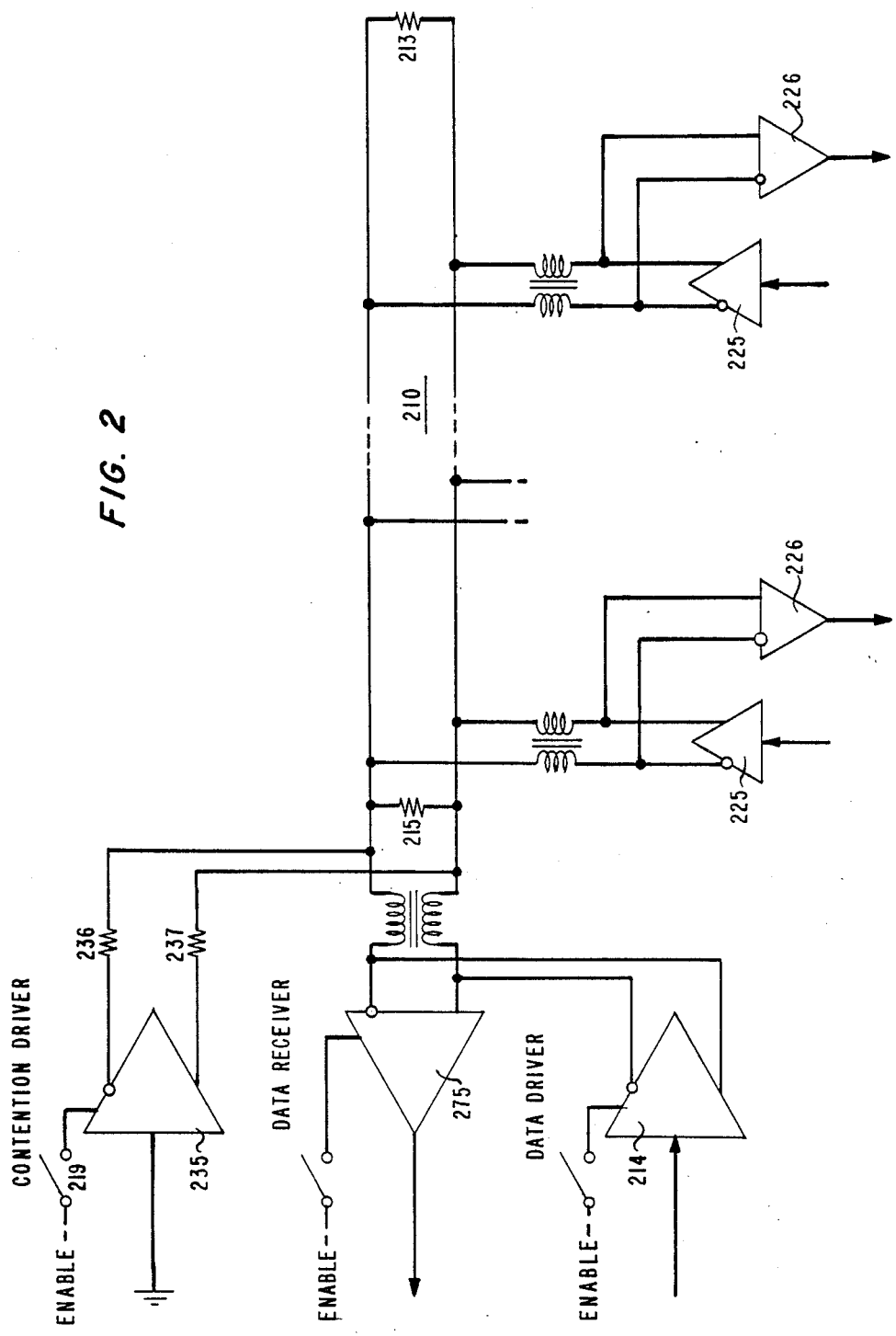
FIG. 2 is a schematic showing the bias drive arrangement of the data distribution bus shown in FIG. 1.

A bus drive scheme for both data transmission and contention between data processing stations is disclosed in FIG. 2. A data distribution bus 210 is shown terminated at its near end and far end by resistive terminations 215 and 213, respectively. The resistive termination 213 is selected to equal the resistive value of the characteristic impedance of bus 210. The resistive termination 215 is selected to equal the resistive value of the characteristic impedance of the bus when it is connected in parallel with resistors 236 and 237 which in turn are in series with the output impedance of contention driver 235. As shown there is a data driver amplifier 214 and a data receiver amplifier 275 connected to the near end of the bus 210. These amplifiers are embodied as tristate devices. A contention driver amplifier 235, also a tristate device, is connected via the balanced resistors 236 and 237 to the near end of the bus 210. The contention driver amplifier 235 is shown connected to ground level (or zero voltage) to indicate that contention driver 235 must have a zero state input and must be separately enabled by the direction and interval control (shown in FIG. 1) during a contention interval. A plurality of data transmission amplifiers 225 and data receiver amplifier 226 are connected along the length of the bus 210 each of which interconnect it to individual data processing devices.

During a contention interval the contention driver 235 is enabled by closing of switch 219 and a zero state is applied to drive bus 210 to a 'weak' zero logic state. The contention driver's low impedance output connects resistors 236 and 237 in series with each other and with the driver output impedance; with the series connection thereof being connected in parallel with the near end terminating impedance 215. The overall terminating impedance presented to the bus 210 by this parallel network during the contention interval equals the combined impedance of the two balanced resistors in series with the output impedance of contention driver 235, which in turn are in parallel with the near end termination impedance 215 of the bus. This combined impedance includes individual values selected to optimize the termination impedance for contention activity and suitably equals the resistive part of the buses' characteristic impedance. With this resistive network terminating bus 210 the contention driver 235 is enabled to apply a weak logic signal to bus 210 that is sufficiently powerful so that the most distant data processing station will detect this logic zero state, and yet permit any one of the amplifiers 225 to drive the entire bus to a logic 'one' state. Accordingly, the resistive network that terminates the near end of the bus 210 must sufficiently attenuate the the logic zero signal $V_O$ present at the output of the contention driver to provide the optimum amplitude of a weak logic zero signal $V_B$ on bus 210. These two quantities are related by the equation:

$$V_B = BV_O$$

where B is the transmission parameter of the resistive network including resistors 215, 236 and 237 and the output impedance $R_{DO}$ of the contention driver 235. Furthermore, the resistive network terminates the bus 210 with an impedance optimized to minimize signal reflection when a data station places a logic 'one' state on the bus. The value B is related to these values by the equation:

$$B_{network} = \frac{R_{215}(R_o)}{R_{215}(R_o + R_{236} + R_{237}) + (R_{236} + R_{237})R_o}$$

where B is the resistive network transmission parameter seen by the contention driver 235. $R_{236}$ and $R_{237}$ are the values of the balanced coupling resistors 236 and 237, and $R_o$ is the resistive portion of the characteristic impedance bus 210.

Since this resistive network must present a near end bus terminating impedance equal to the resistive portion of its characteristic impedance $R_o$ the following requirement must be met:

$$R_{215} = \frac{R_o(R_{236} + R_{237} + R_{DO})}{R_{236} + R_{237} + R_{DO} - R_o}$$

where $R_{215}$ is the near end terminating impedance 215 of the bus, and $R_{236}$ and $R_{237}$ are the values of the balanced coupling resistors 236 and 237 and $R_{DO}$ is the output impedance of the contention driver 235. $R_o$ is the resistive portion of the characteristic bus impedance.

Suitable values for these resistive components for the terminating and balanced resistors may be readily derived from these two equations in view of anticipated worst case operating conditions, and the level of power input.

Since the 'zero' state is nominally held on the data transmission bus 210 by the contention driver 235, the individual station interfaces amplifiers 225 need only disable their tristate output devices in order to output a logic zero. If any one station applies a logic 'one' to the bus, the contention process is such that stations outputting a logic 'zero' at that time drop out of contention.

When data is being prepared to be sent by any of the data processing devices during the data transmission mode, the transmit the contention drivers 214 and 235 are disabled to their tristate state and the line termination value is determined solely by the termination resistances 215 and 213.

Figure 3:
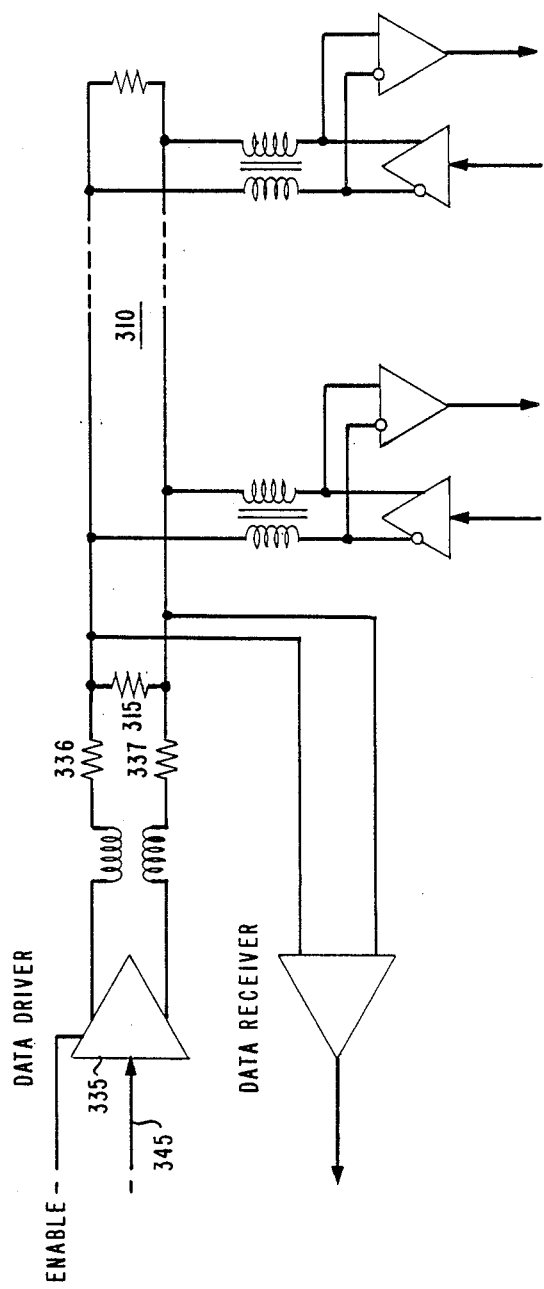
FIG. 3 is a schematic showing an alternative embodiment of a bias drive for a data distribution bus.

The bus drive scheme shown in FIG. 3 is an alternative embodiment suitable for application in situations where the length of the data distribution bus 310 is relatively short as compared with the system disclosed in FIG. 2. In the bias drive scheme shown in FIG. 3 the data driver and contention driver function are combined into a single driver amplifier 335 which is connected to the data transmission bus 310 via a resistive network including termination resistor 315 and the balanced resistors 336 and 337. When data is applied to the bus 310, the data driver amplifier 335 is enabled and the data is applied to the bus via the resistive network. While the resistive network will attenuate the data signal, this is not critical if the length of the bus 310 is kept within a length that will provide a sufficient signal amplitude at the far end of the bus 310. During a contention interval, the driver circuit is also enabled and an input logic zero signal applied to lead 345 holds the bus 310 at a weak logic "O" state.

Figure 4:
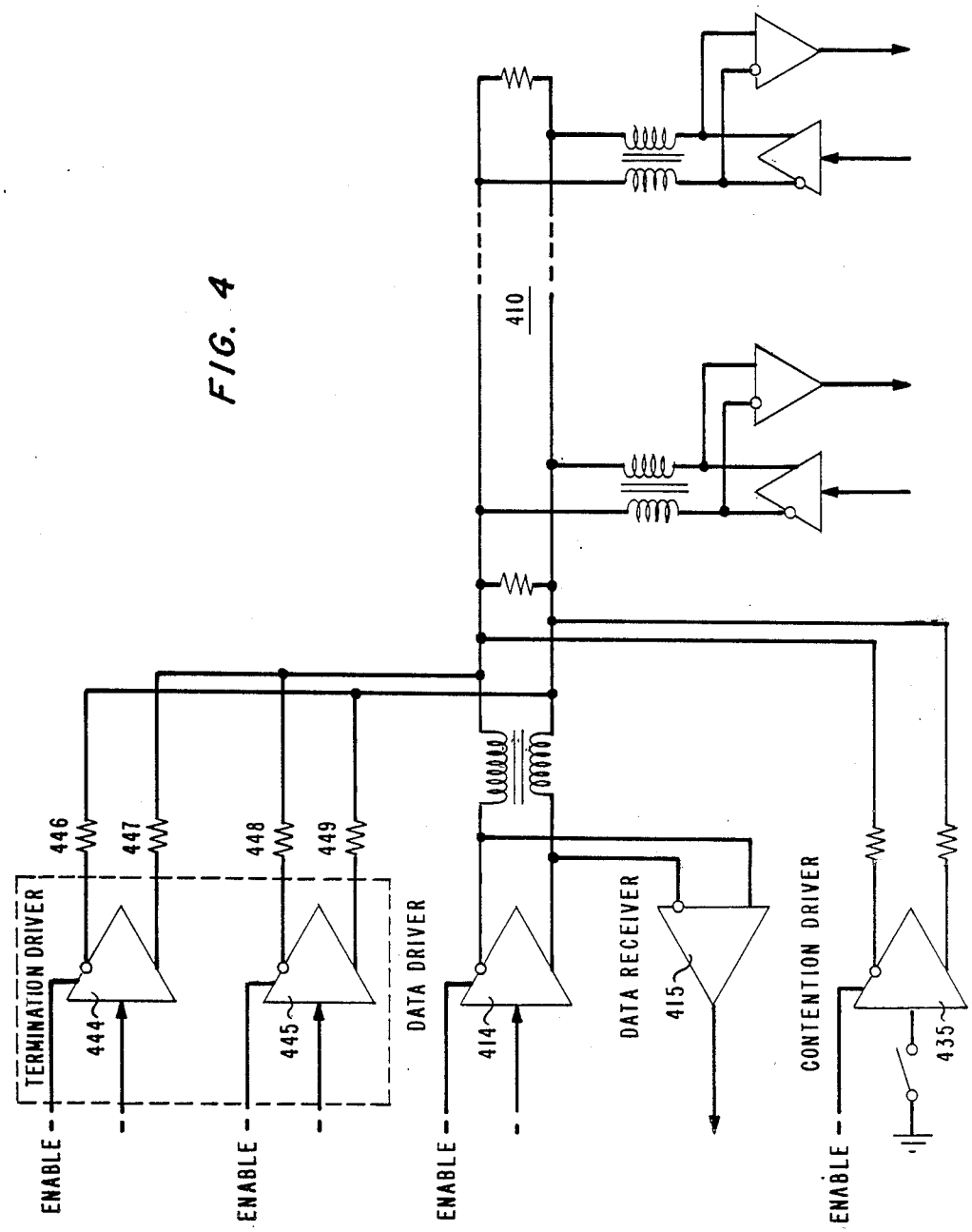
FIG. 4 is a schematic showing yet another alternative embodiment of a bias drive for a data distribution bus.

Another alternative bias drive arrangement is disclosed in FIG. 4 for application to data distribution buses where minimizing signal reflections due to the slight mismatch in termination impedance is deemed necessary. The drive system includes a data drive amplifier 414, a data receive amplifier 415 and a contention driver 435. The drive scheme further includes the duel termination drivers 444 and 445 which are enabled to be simultaneously operative during data transmission intervals to positively assume a proper line termination at the near end of the data transmission bus 410 and minimize signal reflections. The top termination driver 444 and the lower termination driver 445 are each connected to the bus 410 with opposite polarity to each other so that no logic state is applied to the data transmission bus by the termination drivers when the two termination drivers are enabled. The balanced resistors 446, 447, 448 and 449 are selected with a value such that when the termination drivers area both enabled simultaneously, and the data driver 414 and contention driver 435 are disabled, the near end of the data transmission bus will be terminated by its characteristic impedance.

What is claimed is:

1. A local area data distribution bus accessing arrangement, comprising
    a bus having a far end and a near end,
    a first termination impedance connected at the far end of the bus,
    at least a first and a second station interface connected to the bus intermediate the far end and the near end,
    a data driver/receiver coupled through the second termination impedance connected to the near end of the bus and operative to transmit and receive data during intervals of non-contention,
    a contention driver, an impedance network connecting the contention driver through the second termination impedance to the near end of the bus, the contention driver being operative during intervals of contention to drive the bus through the impedance network and the second termination impedance to a predetermined and controlled weak logic state level in alternative operation to logic states suppressed by the data driver and selected to enhance contention operation which weak logic state is at such a bias level that an entire length of the bus is at that logic state but wherein each station interface can override that logic state and force the bus to an opposite logic state.

2. A local area data distribution bus accessing arrangement, as defined in claim 1 and further comprising:
    a termination driver and a second impedance arrangement connecting the termination driver to the near end of the bus, the termination driver being operative during intervals of non-contention to terminate the near end of the bus in its characteristic impedance.

3. A local area data distribution bus accessing arrangement for optimizing performance during contention and non-contention intervals comprising:
    a bus having a far end and a near end,
    a first termination impedance connected at the far end of the bus, and a second termination impedance connected at the near end of the bus,
    at least a first and second station interface connected to the bus intermediate the far end and the near end and operative for coupling to first and second data processing devices which station interfaces may contend with each other for access to the bus,
    a data driver connected to the near end of the bus and operative to transmit data, contention control means for facilitating bus access requests from the first and second station interfaces, a contention driver and an impedance network connecting the contention driver to the near end of the bus and operative for driving the bus to a weak logic state during the contention intervals different from logic states of data transmissions, the weak logic state at a signal level sufficient to bias the bus but easily overridden by an opposite logic state applied by the first and second interfaces, the contention control means operative to disable the data driver and enable the contention driver during the contention intervals when the first and second interfaces seek bus access, the impedance network being operative upon enabling of the contention driver to apply a selected termination impedance to the near end of the bus that is operative to minimize signal reflections on the bus during the contention interval and combined with the weak logic state to enable the first and second interfaces to drive the bus to priority check code states by overriding the weak logic state.

4. A local area data distribution bus accessing arrangement, as defined in claim 3 wherein a common mode choke couples the data driver to the near end of the bus and the impedance network comprises a balanced pair of resistors connecting the contention driver to the near end of the bus.

5. A local area data transmission bus accessing arrangement, comprising:

a bus having a near end and a far end and having at least two operating states including a data transmission mode and a contention for access mode, first and second station interconnection modules connected to the bus intermediate to the far end and the near end, each module having an enable and disable mode of operation operative thereby to apply logic one states and logic zero states to the bus, a first impedance termination having a first resistance value sized to minimize signal reflections connected to the far end of the bus, a second impedance termination having a second resistance value sized to facilitate application of data to the bus connected to the near end of the bus, a data driver connected to a near end of the bus and operative during the data transmission mode of the bus to transmit data to the bus and the data driver further being inoperative during a contention for access mode of the bus, a contention driver and an impedance network connected to the near end of the bus, the contention driver being operative during a contention for access mode to apply a specified and predetermined weak logic state to the bus different from a logic state of a data transmission and sufficient in magnitude to bias the entire bus to the weak logic state, through the impedance network in response to operation of the contention driver establishing a selected termination impedance at the near end having a resistance value substantially equal to the first resistance value in order to facilitate an output of one of the first and second station interconnection modules to readily override the specified and predetermined weak logic state established by the contention driver which weak logic state is small enough in signal magnitude to permit each of the station interconnection modules to substitute a logic state of its own on the bus.

6. A bus biasing arrangement for improving bus accessing in a local area network, comprising a bus having a near end and a far end and being operated in at least two distinct operating states including a data transmission mode and a contention for access mode, first and second station interconnection modules for coupling data processing devices to the bus and connected to the bus intermediate the far end and the near end, each module having an output driver for driving the bus to a predetermined and controlled logic state, a first termination impedance coupled to the far end of the bus, a second termination impedance coupled to the near end of the bus, a data driver connected to the near end of the bus and operative during the data transmission mode of the bus to transmit data to the bus from a data source external to the first and second station interconnection modules and the data driver further being nonoperative during a contention for access mode of the bus, a contention driver having a third termination impedance connected to the near end of the bus, and being operative during a contention for access mode for driving the bus through the third termination impedance to a specified and predetermined weak logic state, the weak logic state being different from a logic state of a data transmission and creating a signal level on the bus to facilitate an output of one of the first and second station interconnection modules to readily override the specified and predetermined weak logic state established by the contention driver and substitute a logic state on the bus as determined and controlled by the output of one of the first and second station interconnection modules.

7. A bus biasing arrangement as defined in claim 6 wherein the contention driver includes a differential line driver with a low output impedance to facilitate the series connection when the differential line driver is active.

8. A local area data distribution bus accessing arrangement as defined in claim 1, 3, 5 or 6 wherein the bus comprises a pair of wires and the impedance network includes first and second resistors of equal value connected in series with first and second lines of the pair of wires.

9. A local area data distribution bus accessing arrangement, comprising a bus having a near end and a far end and being operated in at least two distinct operating states including a data transmission mode and a contention for access mode, first and second station interconnection modules for coupling data processing stations to the bus and connected to the bus intermediate the far end and the near end, each module having a bias drive for driving the bus to a predetermined and controlled logic state, a first termination impedance having a first resistance equal to the characteristic impedance of the bus coupled to the far end of the bus, a second termination impedance having a second resistance differing from the characteristic impedance of the bus coupled to the near end of the bus, a data driver connected to the near end of the bus through an impedance network, the impedance network combining with the second termination impedance to terminate the near end of the bus in its characteristic impedance, the data driver being operative during the data transmission mode of the bus to transmit data to the bus, the data driver being further operative during a contention for access mode for driving the bus to a specified and predetermined weak logic state to facilitate application of contention codes to the bus by the first and second station interconnection module, the weak logic state being different from data transmission logic states and controlled in magnitude so as to be readily overridden by contention code logic signals.

10. A local area data distribution bus accessing arrangement comprising:
   a bus having a far end and a near end,
   a first termination impedance connected at the far end of the bus,
   at least a first and a second station interface connected to the bus intermediate the far end and the near end,
   a data driver/receiver coupled through a second termination impedance connected to the near end of the bus and operative to transmit and receive data during intervals of non-contention,
   a contention driver, an impedance network connecting the contention driver through the second termination impedance to the near end at the bus, the contention driver being operative during intervals of contention to drive the bus through the impedance network and the second termination impedance to a predetermined and controlled weak logic state level in alternative operation to the data driver and selected to enhance contention operation,
   a termination driver and a second impedance arrangement connecting the termination driver to the near end of the bus,
   the termination driver including;
   a first and a second differential line driver,
   the first and second differential line driver each being connected to a near end of the data transmission bus with an opposite polarity orientation so that signal outputs of the first and second differential line drivers are superimposed on each other so as to provide a null signal at the near end of the bus,
   the termination driver being operative during intervals of noncontention to terminate the near end of the bus in its characteristic impedance.

11. A bus biasing arrangement for improving bus accessing in a local area network, comprising
   a bus having a near end and a far end and being operated in at least two distinct operating states including a data transmission mode and a contention for access mode,
   first and second station interconnection modules for coupling data processing devices to the bus and connected to the bus intermediate the far end and the near end, each module having an output driver for driving the bus to a predetermined and controlled logic state,
   a first termination impedance coupled to the far end of the bus,
   a second termination impedance coupled to the near end of the bus and comprising a first resistor,
   a data driver connected to the near end of the bus and operative during the data transmission mode of the bus to transmit data to the bus from a data source external to the first and second station interconnection modules and the data driver further being nonoperative during a contention for access mode of the bus,
   a contention driver having a third termination impedance connected to the near end of the bus, and being operative during a contention for access mode for driving the bus through the third termination impedance to a specified and predetermined weak logic state, the weak logic state creating a signal level on the bus to facilitate an output of one of the first and second station interconnection modules to readily override the specified and predetermined weak logic state established by the contention driver and substitute a logic state on the bus as determined and controlled by the output of one of the first and second station interconnection modules,
   the third termination impedance comprising a second and a third resistor connected in a series connection and the series connection being connected in shunt with the first resistor.

12. A local area data distribution bus accessing arrangement, comprising
   a bus having a far end and a near end and comprising a pair of wires,
   a first termination impedance connected at the far end of the bus,
   at least a first and a second station interface connected to the bus intermediate the far end and the near end,
   a data driver/receiver coupled through the termination impedance connected to the near end of the bus and operative to transmit and receive data during intervals of non-contention,
   a contention driver, an impedance network comprising a first and second resistor of equal value connected in series with first and second lines of the pair of wires, respectively, and connecting the contention driver through the second termination impedance to the near end of the bus, the contention driver comprising a differential line driver having a low output impedance when activated and being coupled to connect the first and second resistors and the output impedance in a series connection shunted across the second termination impedance, the contention driver being operative during intervals of contention to drive the bus through the impedance network and the second termination impedance to a predetermined and controlled weak logic state level in alternative operation to the data driver and selected to enhance contention operation.

13. A local area data distribution bus accessing arrangement for optimizing performance during contention and non-contention intervals comprising:
   a bus comprising a pair of wires having a far end and a near end,
   a first termination impedance connected at the far end of the bus, and a second termination impedance connected at the near end of the bus, at least a first and second station interface connected to the bus intermediate the far end and the near end and operative for coupling to first and second data processing devices which station interfaces may contend with each other for access to the bus, a data driver connected to the near end of the bus and operative to transmit data, contention control means for facilitating bus access requests from the first and second station interfaces, a contention driver and an impedance network connecting the contention driver to the near end of the bus, the impedance network including first and second resistors of equal value connected in series with first and second lines of the pair of wires, the contention driver comprising a differential line driver having a low output impedance when activated and being coupled to connect the first and second resistors and the output impedance in a series connection shunted across the second termination impedance and the contention driver being operative for driving the bus to a weak logic state during the contention intervals, the contention control means operative to disable the data driver and enable the contention driver during the contention intervals when the first and second interfaces seek bus access, the impedance network being operative upon enabling of the contention driver to apply a selected termination impedance to the near end of the bus that is operative to minimize signal reflections on the bus during the contention interval and combined with the weak logic state to enable the first and second interfaces to drive the bus to priority check code states by overriding the weak logic state.

14. A local area data transmission bus accessing arrangement, comprising:

a bus comprising a pair of wires and having a near end and a far end and having at least two operating states including a data transmission mode and a contention for access mode, first and second station interconnection modules connected to the bus intermediate to the far end and the near end, each module having an enable and disable mode of operation operative thereby to apply logic one states and logic zero states to the bus, a first impedance termination having a first resistance value sized to minimize signal reflections connected to the far end of the bus, a second impedance termination having a second resistance value sized to facilitate application of data to the bus connected to the near end of the bus, a data driver connected to a near end of the bus and operative during the data transmission mode of the bus to transmit data to the bus and the data driver further being inoperative during a contention for access mode of the bus, a contention driver and an impedance network connected to the near end of the bus, the impedance network including first and second resistors of equal value connected in series with first and second lines of the pair of wires, the contention driver including a differential line driver having a low output impedance when activated and being coupled to connect the first and second resistors in a series connection shunted across the second termination impedance, the contention driver being operative during a contention for access mode to apply a specified and predetermined weak logic state to the bus, through the impedance network in response to operation of the contention driver establishing a selected termination impedance at the near end having a resistance value substantially equal to the first resistance value in order to facilitate an output of one of the first and second station interconnection modules to readily override the specified and predetermined weak logic state established by the contention driver and substitute a logic state of its own on the bus.

15. A bus biasing arrangement for improving bus accessing in a local area network, comprising a bus comprising a pair of wires and having a near end and a far end and being operated in at least two distinct operating states including a data transmission mode and a contention for access mode, first and second station interconnection modules for coupling data processing devices to the bus and connected to the bus intermediate the far end and the near end, each module having an output driver for driving the bus to a predetermined and controlled logic state, a first termination impedance coupled to the far end of the bus, a second termination impedance coupled to the near end of the bus, a data driver connected to the near end of the bus and operative during the data transmission mode of the bus to transmit data to the bus from a data source external to the first and second station interconnection modules and the data driver further being nonoperative during a contention for access mode of the bus, a contention driver having a third termination impedance including an impedance network having first and second resistors connected in series with first and second lines of the pair of wires, and connected to the near end of the bus, the contention driver including a differential line driver having a low output impedance when activated and being coupled to connect the first and second resistors and the output impedance in a series connection shunted across the second termination impedance, and being operative during a contention for access mode for driving the bus through the third termination impedance to a specified and predetermined weak logic state, the weak logic state creating a signal level on the bus impedance having to facilitate an output of one of the first and second station interconnection modules to readily override the specified and predetermined weak logic state established by the contention driver and substitute a logic state on the bus as determined and controlled by the output of one of the first and second station interconnection modules.

16. A local area data distribution bus accessing arrangement, comprising a bus having a near end and a far end and being operated in at least two distinct operating states including a data transmission mode and a contention for access mode, first and second station interconnection modules for coupling data processing stations to the bus and connected to the bus intermediate the far end and the near end, each module having a bias drive for driving the bus to a predetermined and controlled logic state, a first termination impedance having a first resistance equal to the characteristic impedance of the bus coupled to the far end of the bus, a second termination impedance having a second resistance differing from the characteristic impedance of the bus coupled to the near end of the bus, a data driver connected to the near end of the bus through an impedance network, the impedance network comprising a balanced pair of resistors connected in a series connection with an output impedance of the data driver, and the series connection being connected in parallel with the second termination impedance, and combining with the second termination impedance to terminate the near end of the bus in its characteristic impedance, the data driver being operative during the data transmission mode of the bus to transmit data to the bus, the data driver being further operative during a contention for access mode for driving the bus to a specified and predetermined weak logic state to facilitate application of contention codes to the bus by the first and second station interconnection module.

* * * * *